US012413898B2

(12) United States Patent
Gontcharov et al.

(10) Patent No.: US 12,413,898 B2
(45) Date of Patent: Sep. 9, 2025

(54) LOUDSPEAKER ARRANGEMENT

(71) Applicant: Harman Becker Automotive Systems GmbH, Karlsbad (DE)

(72) Inventors: Vladimir Gontcharov, Budapest (HU); Hans Erik Otto Lahti, Torslanda (SE); Brian Sterling, Farmington Hills, MI (US)

(73) Assignee: Harman Becker Automotive Systems GmbH, Karlsbad (DE)

( * ) Notice: Subject to any disclaimer, the term of this patent is extended or adjusted under 35 U.S.C. 154(b) by 196 days.

(21) Appl. No.: 18/486,434

(22) Filed: Oct. 13, 2023

(65) Prior Publication Data

US 2024/0040304 A1 Feb. 1, 2024

Related U.S. Application Data

(63) Continuation of application No. PCT/EP2021/059953, filed on Apr. 16, 2021.

(51) Int. Cl.
*H04R 1/24* (2006.01)
*H04R 1/02* (2006.01)

(52) U.S. Cl.
CPC ............... *H04R 1/24* (2013.01); *H04R 1/025* (2013.01); *H04R 2499/13* (2013.01)

(58) Field of Classification Search
CPC ....... H04R 1/24; H04R 1/025; H04R 2499/13
USPC .......................................................... 381/186
See application file for complete search history.

(56) References Cited

U.S. PATENT DOCUMENTS

| | | | | |
|---|---|---|---|---|
| 4,733,749 A | 3/1988 | Newman et al. | | |
| 4,923,031 A | 5/1990 | Carlson | | |
| 2004/0017920 A1 | 1/2004 | Nishikawa | | |
| 2007/0092096 A1* | 4/2007 | Litovsky | H04R 1/2834 | 381/349 |
| 2008/0205682 A1* | 8/2008 | Jenkins | H04R 1/2834 | 381/349 |
| 2009/0245561 A1* | 10/2009 | Litovsky | H04R 1/2834 | 381/345 |
| 2015/0163572 A1 | 6/2015 | Weiss et al. | | |
| 2020/0314546 A1 | 10/2020 | Aleksandrov | | |

FOREIGN PATENT DOCUMENTS

KR 10-2016-0089459 A 7/2016

* cited by examiner

*Primary Examiner* — Sean H Nguyen
(74) *Attorney, Agent, or Firm* — Angela M. Brunetti

(57) ABSTRACT

A loudspeaker arrangement (800) having first and second loudspeakers mechanically coupled to each other. Either a first side of a first sound radiating surface faces a first side of a second sound radiating surface, and the first side of the first sound radiating surface and the first side of the second sound radiating surface both face a first cavity having a first opening facing towards an internal air volume, or a second side of the first sound radiating surface faces a second side of the second sound radiating surface, the first side of the first sound radiating surface faces a second cavity having a second opening facing towards the internal air volume, and the first side of the second sound radiating surface faces a third cavity separate and distinct from the second cavity, the third cavity has a third opening facing towards the internal air volume.

15 Claims, 6 Drawing Sheets

LOUDSPEAKER ARRANGEMENT

CROSS REFERENCE

This application is a continuation of International Application No. PCT/EP21/059953, filed with the European Receiving Office on Apr. 16, 2021, entitled LOUDSPEAKER ARRANGEMENT, the disclosure of which is incorporated in its entirety by reference.

TECHNICAL FIELD

The disclosure relates to a loudspeaker arrangement, in particular to a loudspeaker arrangement within a housing.

BACKGROUND

Loudspeaker arrangements usually comprise a plurality of different components. A loudspeaker enclosure usually accommodates one or more loudspeakers. The loudspeaker enclosure may be mounted to a wall or, e.g., to a panel in a passenger compartment of a vehicle. The loudspeaker enclosure often is screwed to a wall or a panel, for example. Due to the movement of the loudspeaker membranes, magnets, or any other movable elements within a loudspeaker, other elements such as a loudspeaker enclosure may also be excited and vibrate. Further, different parts and elements of the loudspeaker arrangement may be excited and bump or grate against each other. Vibrations of the loudspeaker arrangement may further be transferred to other parts and elements that are directly or indirectly connected to the loudspeaker arrangement such as, e.g., wall panels or other elements that are arranged close to the loudspeaker arrangement in a vehicle. This may result in unwanted noise which may worsen the sound experience for a user. Further, loudspeaker arrangements that are arranged in a vehicle or in a wall of a listening environment are usually required to be comparably small.

SUMMARY

A loudspeaker arrangement includes a first loudspeaker including a first sound radiating surface, a second loudspeaker including a second sound radiating surface, and an enclosure. The first loudspeaker is mechanically coupled to the second loudspeaker, the enclosure encloses the second side of the first sound radiating surface and the second side of the second sound radiating surface, the enclosure comprises a port coupling an internal volume inside the enclosure to outside air, and either a first side of the first sound radiating surface faces a first side of the second sound radiating surface, and the first side of the first sound radiating surface and the first side of the second sound radiating surface both face a first cavity, the first cavity comprising a first opening facing towards an internal air volume, or a second side of the first sound radiating surface faces a second side of the second sound radiating surface, the first side of the first sound radiating surface faces a second cavity, the second cavity comprising a second opening facing towards the internal air volume, and the first side of the second sound radiating surface faces a third cavity separate and distinct from the second cavity, the third cavity comprising a third opening facing towards the internal air volume.

Other systems, methods, features and advantages will be or will become apparent to one with skill in the art upon examination of the following detailed description and figures. It is intended that all such additional systems, methods, features, and advantages be included within this description, be within the scope of the invention and be protected by the following claims.

BRIEF DESCRIPTION OF THE DRAWINGS

The arrangement may be better understood with reference to the following description and drawings. The components in the figures are not necessarily to scale, emphasis instead being placed upon illustrating the principles of the invention. Moreover, in the figures, like referenced numerals designate corresponding parts throughout the different views.

DETAILED DESCRIPTION

Figure 1:
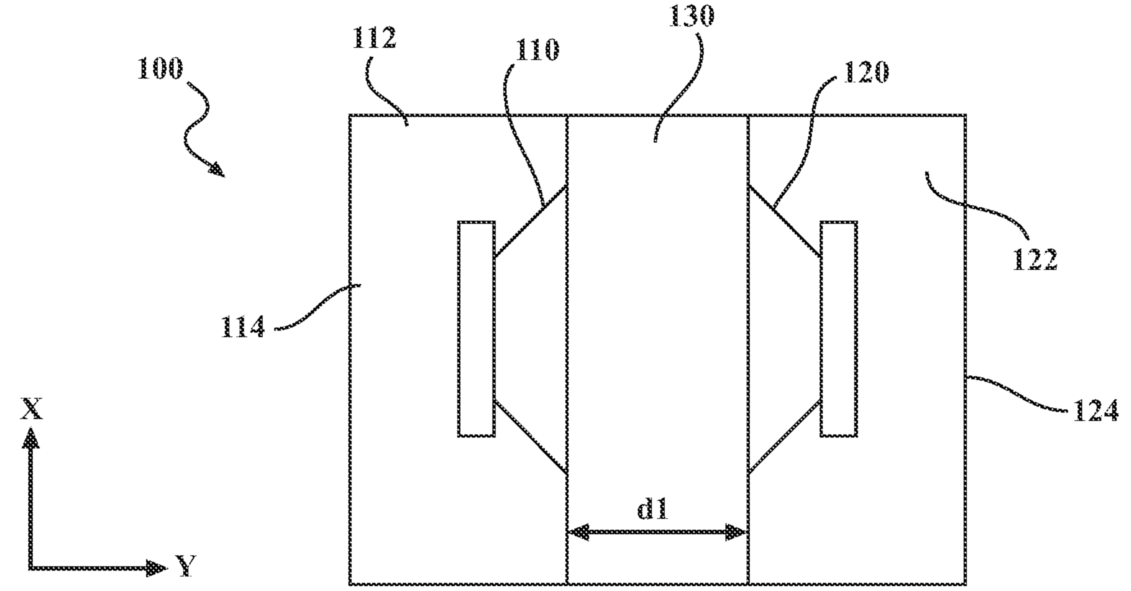
FIG. 1 schematically illustrates a cross-sectional view of a loudspeaker arrangement.

Referring to FIG. 1, a loudspeaker arrangement 100 is schematically illustrated. In particular, FIG. 1 schematically illustrates a cross-sectional view of a loudspeaker arrangement 100. The loudspeaker arrangement 100 may, e.g., be mounted into a wall or in a vehicle. The loudspeaker arrangement 100 comprises a first loudspeaker 110 and a second loudspeaker 120. The first loudspeaker 110 comprises a first sound radiating surface (e.g., a first membrane), and the second loudspeaker 120 comprises a second sound radiating surface (e.g., a second membrane). The first loudspeaker 110 and the second loudspeaker 120 are arranged opposite each other in a first direction y. That is, a first side of the first sound radiating surface is arranged opposite to and faces a first side of the second sound radiating surface. The first sound radiating surface in this example is arranged essentially parallel to the second sound radiating surface. A distance d1 between the first loudspeaker 110 and the second loudspeaker 120 may be between 1 cm and 20 cm, for example. The distance d1 between the first loudspeaker 110 and the second loudspeaker 120 may depend on the size of the loudspeakers 110, 120, for example.

A first cavity 130 is formed between a front side of the first loudspeaker 110 and a front side of the second loudspeaker 120. The first loudspeaker 110 and the second loudspeaker 120 may radiate sound into the first cavity 130. The first cavity 130 may comprise an opening through which sound generated by the first loudspeaker 110 and sound generated by the second loudspeaker 120 may exit the first cavity 130 towards the environment. The opening may be completely open or may be covered with a vented covering such as a fabric or mesh that may provide a decorative exposure to a wall containing the enclosure. A wall surface opposite the opening is closed along the entire length of the opening so that sound radiates from the opening. The opening, however, is not visible in the cross-sectional view of FIG. 1 as it is arranged in another image plane.

The loudspeaker arrangement 100 may further comprise an enclosure comprising a first enclosure part 114 and a second enclosure part 124. The first enclosure part 114 forms a first cavity 112 surrounding a back side of the first loudspeaker 110. The second enclosure part 124 forms a second cavity 122 surrounding the back side of the second loudspeaker 120. According to another example, the first enclosure part 114 and the second enclosure part 124 together may form a single cavity surrounding the back side of both the first loudspeaker 110 and the second loudspeaker 120.

Figure 2:
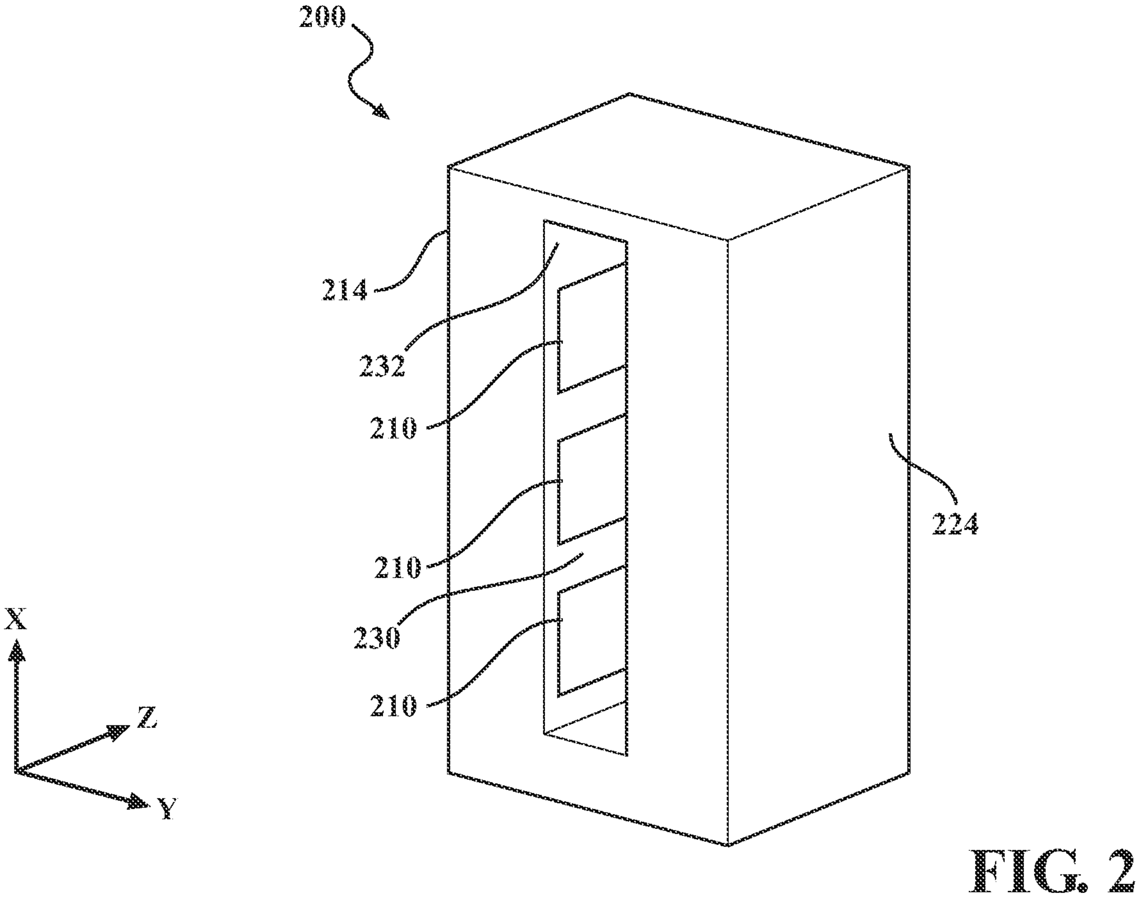
FIG. 2 schematically illustrates a dimensional view of another loudspeaker arrangement.

The loudspeaker arrangement 100 illustrated in FIG. 1 comprises one pair of loudspeakers, the pair of loudspeakers including the first loudspeaker 110 and the second loudspeaker 120. This, however, is only an example. It is also possible that a loudspeaker arrangement comprises more than two loudspeakers. This is exemplarily illustrated in FIG. 2 which schematically illustrates a dimensional view of another loudspeaker arrangement 200. The loudspeaker arrangement 200 illustrated in FIG. 2 comprises three pairs of loudspeakers, each pair of loudspeakers formed by a first loudspeaker 210 and a second loudspeaker (not visible in the dimensional view of FIG. 2). Any other number of loudspeakers, however, is also possible. While in the Figures only pairs of loudspeakers are illustrated, it is generally also possible that the loudspeaker arrangement 100, 200 comprises an uneven number of loudspeakers. This will be exemplarily illustrated by means of FIGS. 9 and 10 below.

Each of the at least two loudspeakers may be arranged similarly to what has been described with respect to the first and second loudspeaker 110, 120 of FIG. 1 above. The first cavity 230 may be formed continuously between all (pairs of) loudspeakers, for example. The first enclosure part 214 may enclose all first loudspeakers 210 and form a continuous closed cavity at the back side of the first loudspeakers 210. However, it is also possible that a separate cavity is formed at the back side of each of the first loudspeakers 210. The same applies for the second loudspeakers and the second enclosure part 224, which may form a single continuous cavity at the back side of the second loudspeakers, or separate cavities for each of the second loudspeakers. According to another example, it is also possible that the first loudspeakers 210 and the second loudspeakers are all arranged in a single continuous cavity formed by the enclosure at the back sides of the loudspeakers. The opening 232 of the first cavity 230 may face towards a second direction z which is perpendicular to the first direction y. If the loudspeaker arrangement 200 comprises more than two loudspeakers, two or more loudspeakers may be arranged successively in a third direction x, which is perpendicular to both the first direction y and the second direction z.

Figure 3:
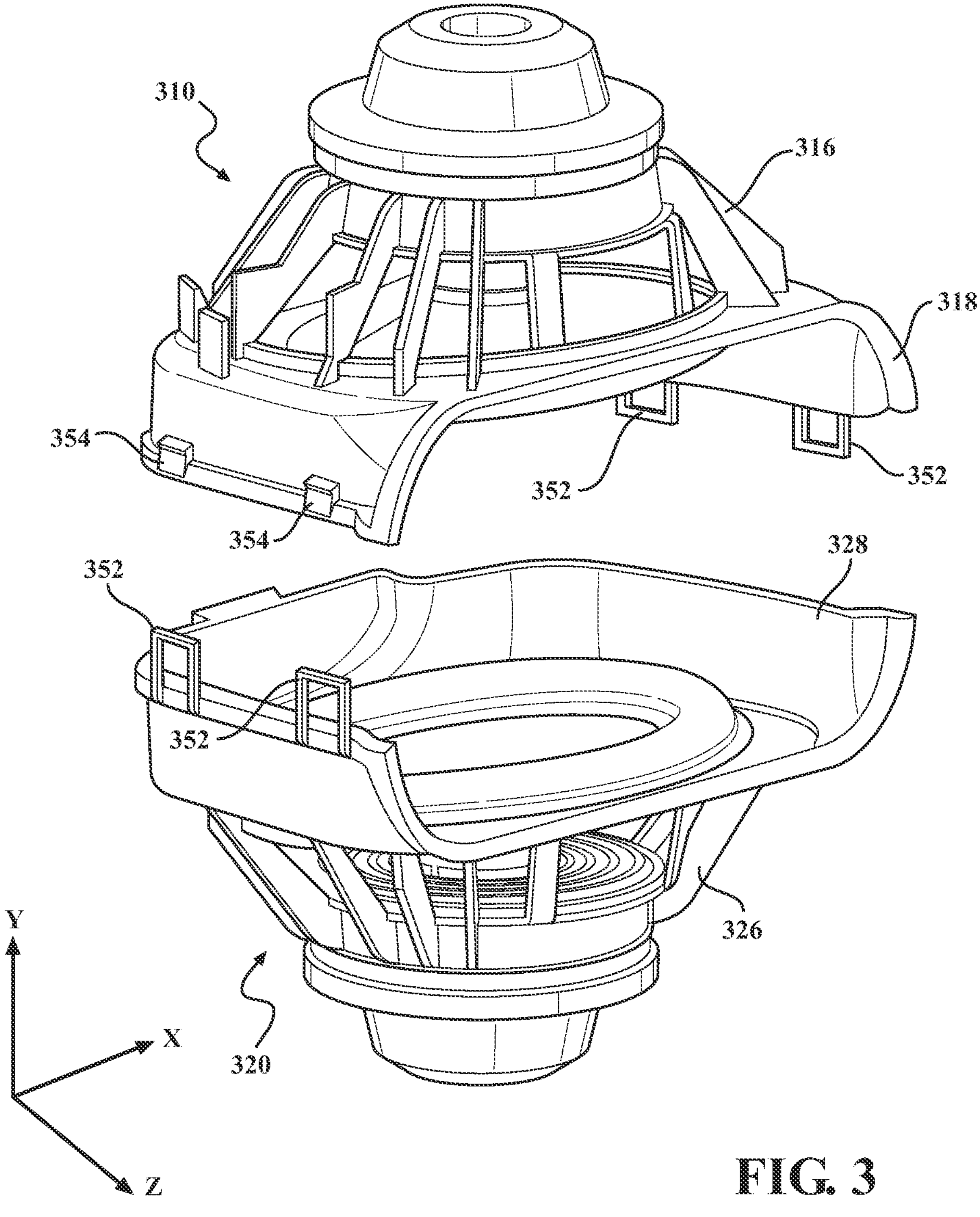
FIG. 3 schematically illustrates a dimensional view of loudspeakers of a loudspeaker arrangement in an unmounted state.

Now referring to the exploded view of FIG. 3, a first loudspeaker 310 and a second loudspeaker 320 are schematically illustrated in an unmounted state. A loudspeaker enclosure is not specifically illustrated in FIG. 3. The first loudspeaker 310 comprises a first loudspeaker basket 316, and the second loudspeaker 320 comprises a second loudspeaker basket 326. According to one example, the first loudspeaker 310 and the second loudspeaker 320 may be arranged opposite each other in the first direction y and may be mechanically coupled to each other. According to one example, the first loudspeaker basket 316 is mechanically coupled to the second loudspeaker basket 326. The first loudspeaker 310 or first loudspeaker basket 316 may be coupled to the second loudspeaker 320 or second loudspeaker basket 326 by means of first and second connection elements 352, 354. For example, the first loudspeaker 310 may comprise a plurality of first connection elements 352 and a plurality of second connection elements 354. The second loudspeaker 320 may also comprise a plurality of first connection elements 352 and a plurality of second connection elements 354, wherein each first connection element 352 of the second loudspeaker 320 forms a counterpart for a second connection element 354 of the first loudspeaker 310, and each second connection element 354 of the second loudspeaker 320 forms a counterpart for a first connection element 352 of the first loudspeaker 310. Using connection elements to couple the first loudspeaker 310 to the second loudspeaker 320, however, is only an example. The loudspeakers 310, 320 can be coupled in any other suitable way. According to another example, the first loudspeaker 310 and the second loudspeaker 320 are glued together.

The first loudspeaker 310 may comprise a first projection 318. The first projection 318 may extend from the first loudspeaker basket 316 in the first direction y towards the second loudspeaker 320. The first projection 318, in a plane defined by the second direction z and the third direction x, may at least partly surround the first sound radiating surface. As is schematically illustrated in FIG. 3, the first projection 318 may be omitted towards one side, in order to form the opening 332. The second loudspeaker 320 may comprise a second projection 328. The second projection 328 may extend from the second loudspeaker basket 326 in the first direction y towards the first loudspeaker 310. The second projection 328, in a plane defined by the second direction z and the third direction x, may at least partly surround the second sound radiating surface. As is schematically illustrated in FIG. 3, the second projection 328 may be omitted towards one side, in order to form the opening 332. The first connection elements 352 and the second connection elements 354 may be arranged along the first projection 318 and the second projection 328, respectively. When the first loudspeaker 310 and the second loudspeaker 320 are coupled to each other, the first projection 318 and the second projection 328 may be coupled to each other, thereby connecting the first loudspeaker basket 316 to the second loudspeaker basket 326. The first cavity 330 may be defined by the first and the second projection 318, 328. That is, the first and the second projection 318, 328 partially surround the first cavity 330 in a plane defined by the second direction z and the third direction x.

When a connection is formed between the first loudspeaker 310 and the second loudspeaker 320, the first cavity 330 is formed between the first loudspeaker 310 and the second loudspeaker 320, with an opening 332 formed towards the second direction z.

The first loudspeaker 310 and the second loudspeaker 320 during use (e.g., when the first sound radiating surface and the second sound radiating surface are excited in order to produce sound) both generate vibrations. By mechanically connecting the first loudspeaker 310 to the second loudspeaker 320, the vibrations of the two loudspeakers 310, 320 can cancel each other out. That is because both loudspeakers 310, 320 generally receive the same sound signal and produce the same sound at the same time. That is, both loudspeakers vibrate simultaneously. By mounting the loudspeakers to face each other, the vibrations are inverse to each other and, therefore, counteract each other. In this way, the resulting vibrations of the loudspeaker arrangement 300 comprising the first loudspeaker 310 and the second loudspeaker 320, are zero or at least close to zero. Therefore, almost zero vibration is transferred to any surround parts such as a loudspeaker enclosure, for example. The same applies for an arrangement comprising more than two loudspeakers.

Figure 4:
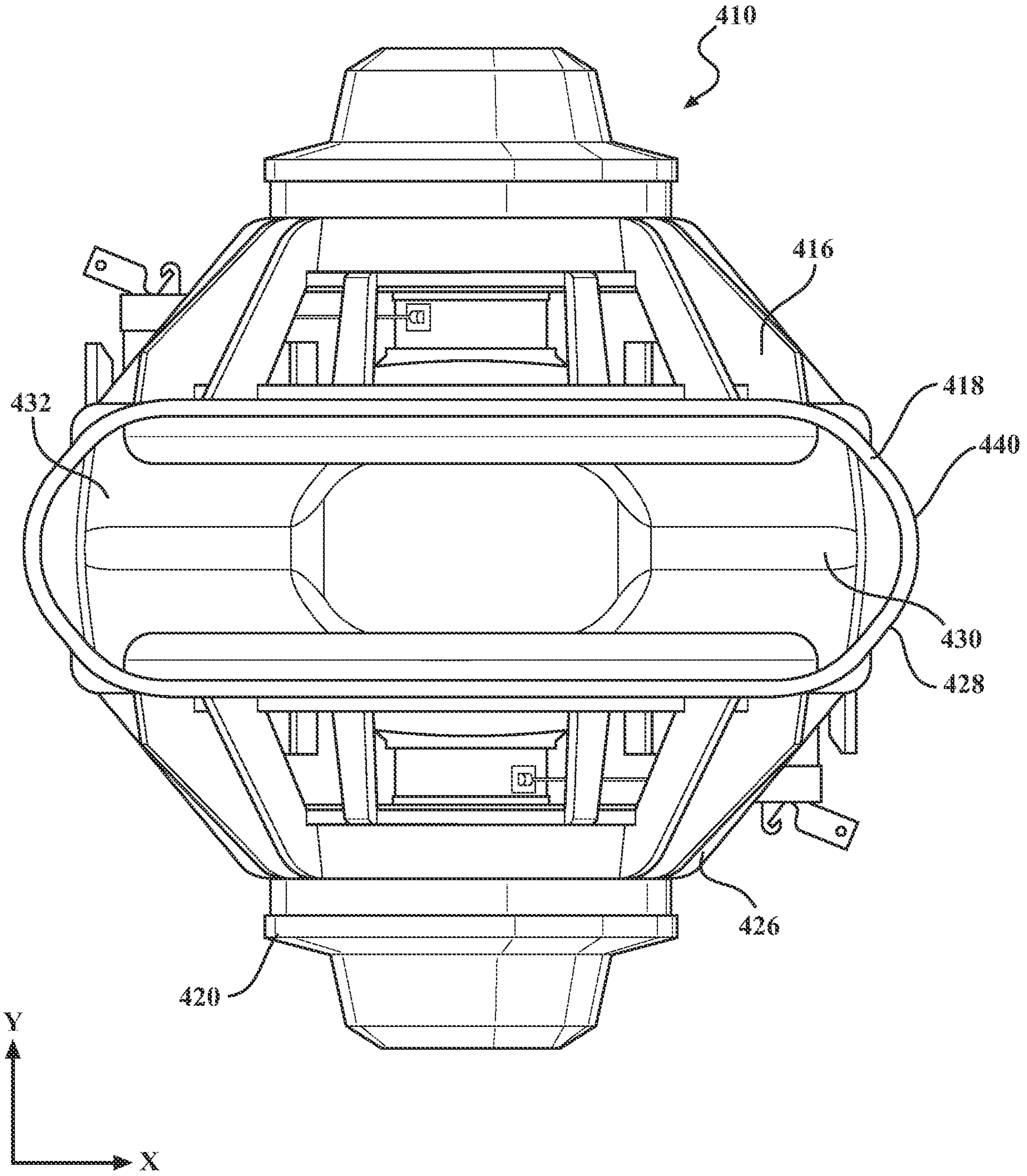
FIG. 4 schematically illustrates a front view of loudspeakers of a loudspeaker arrangement.
Figure 5:
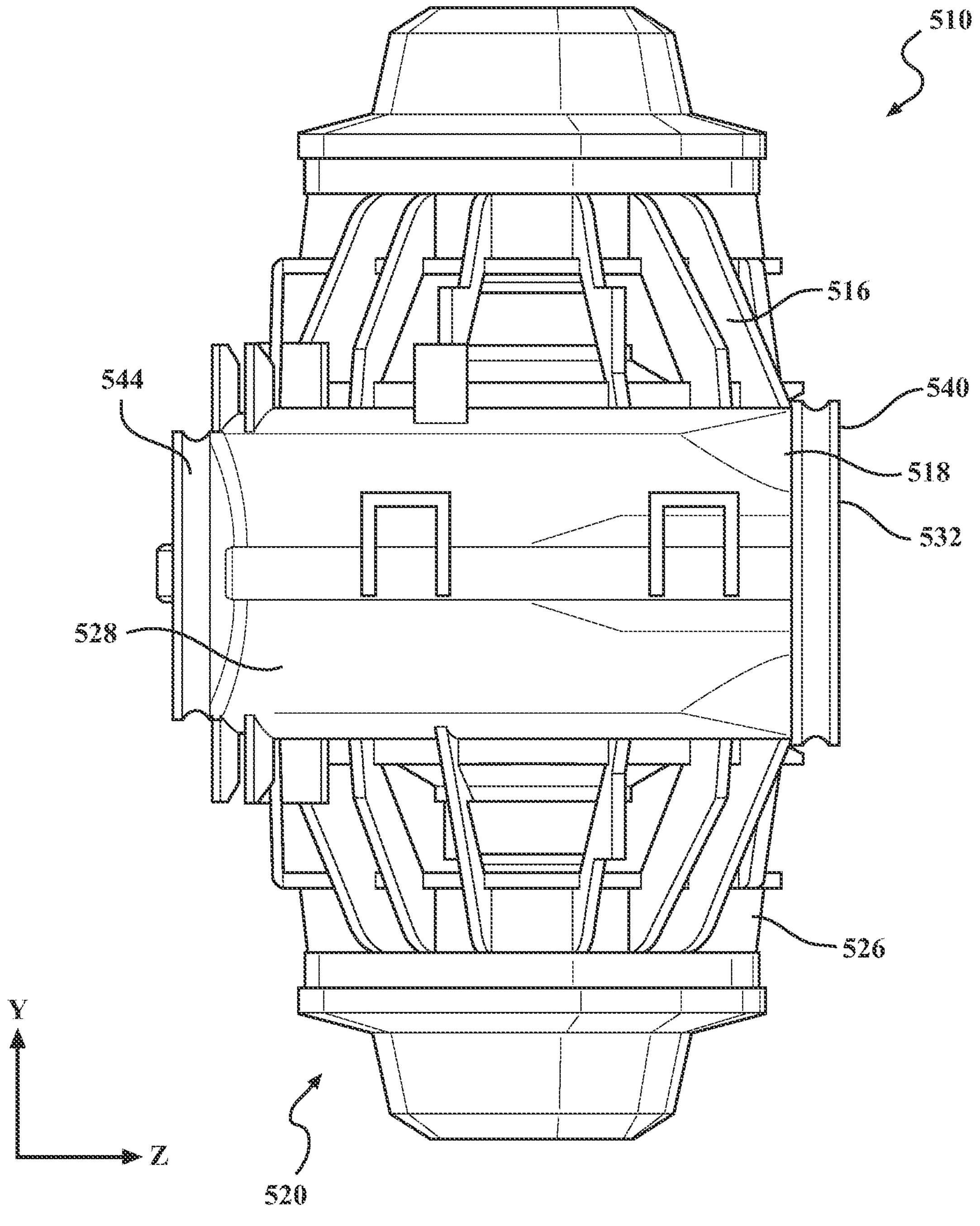
FIG. 5 schematically illustrates a side view of loudspeakers of a loudspeaker arrangement.

A first loudspeaker 410 and a second loudspeaker 420 in a mounted state are exemplarily illustrated in the front view of FIG. 4 and in the side view of FIG. 5. As can be seen in the side view of FIG. 5 for example, when the first loudspeaker 510 is connected to the second loudspeaker 520, a third projection 540 and a fourth projection 544 are formed by the first loudspeaker 510 and the second loudspeaker 520. The third projection 540 extends from the loudspeaker arrangement 500 in the second direction z, and the fourth projection 544 extends from the loudspeaker arrangement 500 in the second direction z, opposite to the first projection 540. According to one example, the third projection 540 may be formed by the first loudspeaker basket 516 or the first projection 518 and the second loudspeaker basket 526 or the second projection 528, and the fourth projection 544 may also be formed by the first loudspeaker basket 516 or the first projection 518 and by the second loudspeaker basket 526 or the second projection 528. For example, an upper half of the third projection 540 and an upper half of the fourth projection 544 may be formed by the first loudspeaker 510 (first loudspeaker basket 516 or first projection 518), and a lower half of the third projection 540 and a lower half of the fourth projection 544 may be formed by the second loudspeaker 520 (second loudspeaker basket 526 or second projection 528).

Each of the third projection 440, 540 and the fourth projection 444, 544 may comprise a protruding edge or ledge, for example. The third projection 440, 540 may surround the opening 432 of the first cavity 430 in a plane defined by the second and third direction z, x, for example. As is schematically illustrated in FIG. 4, the opening 432 may have an elongated form (cross-section), e.g., rectangular with rounded corners. Any other form (cross-section) of the opening 432, however, is also possible such as, square, rectangular, rounded, or oval, for example. Again referring to FIG. 5, the fourth projection 544 may be arranged opposite to the third projection 540 in the second direction z. That is, the fourth projection 544 may be arranged at a rear wall of the first cavity 530 and the third projection 540 may be arranged at the front of the first cavity 530, for example. This, however, is only an example. According to another example (not illustrated), the third projection 540 may be arranged at a first side wall of the first cavity 530 and the fourth projection 544 may be arranged at a second side wall of the first cavity 430, for example. In the latter case, however, the third projection 540 may not surround the opening 532 of the first cavity 530. The third projection 540 and the fourth projection 544 can be used, for example, to mount the loudspeakers 410, 420 in an enclosure (enclosure not illustrated in FIGS. 4 and 5).

Figure 6:
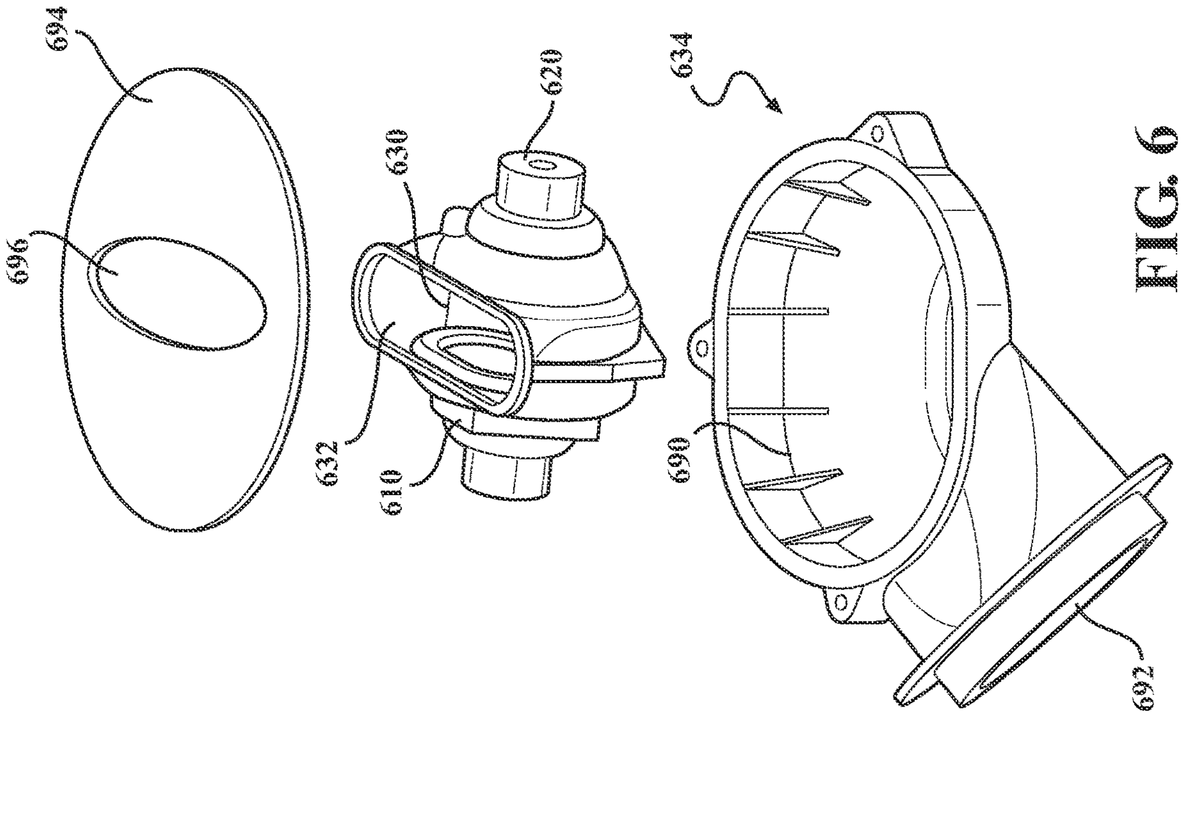
FIG. 6 schematically illustrates an exploded view of an exemplary loudspeaker arrangement.

Now referring to FIG. 6, a loudspeaker arrangement according to one example is schematically illustrated. In the example illustrated in FIG. 6, the first loudspeaker 610 (i.e., the first loudspeaker basket) and the second loudspeaker 620 (i.e., the second loudspeaker basket) are mechanically coupled to each other, as has been explained with respect to FIGS. 1 to 5 above. The loudspeaker enclosure 634 illustrated in FIG. 6 comprises a cavity or air volume chamber 690 and a vent duct or port 692. The port 692 allows to vent the cavity 690 to outside air. That is, the opening 632 of the first cavity 630 formed between the first loudspeaker 610 and the second loudspeaker 620 may face the interior of a vehicle or a room. The loudspeakers 610, 620, therefore, radiate sound into the internal air volume (e.g., room, or car cabin), while the port 692 provides a vent towards the outside air (e.g., outside of room, or outside of vehicle). This allows for a small size of the loudspeaker arrangement. In particular, the enclosure 634 as illustrated in FIG. 6 can be much smaller than an enclosure not comprising a port. By providing an enclosure 634 comprising a port 692, the enclosure 634 provides an unclosed air volume inside the cavity 690 which communicates with the outside air (e.g., with the outside of a vehicle). In this way, antiphase sound pressure generated at the rear sides of the loudspeakers 610, 620 (rear sides facing the cavity 690) is prevented from entering the internal air volume (e.g., room, or car cabin), thus preventing sound cancellation in the internal air volume. This can prevent a reduction in sound pressure in the internal air volume. Further, a degradation of sound quality can be reduced.

The arrangement comprising the first loudspeaker 610 and the second loudspeaker 620 and, optionally, further loudspeakers, that has been described with respect to FIGS. 1 to 5 above, may be arranged in the enclosure 634 such that a single cavity 690 is formed, the single cavity 690 surrounding the back side of the at least two loudspeakers. The loudspeaker arrangement may further comprise a cover 694, configured to close the enclosure 634 towards the internal air volume. That is, the cover 694 may form a part of a panel in the interior of a vehicle or a part of a wall in a room, for example. The cover 694 comprises an opening 696. The opening 696 may be aligned with the opening 632 of the first cavity 630. In this way, the opening 632 of the first cavity 630 remains open and uncovered, while the enclosure 634 and, in particular, the air volume chamber 690 is closed towards the internal air volume. That is, the enclosure 634 is closed towards the internal air volume, while an opening is provided by the port 692 towards outside air.

Figure 7:
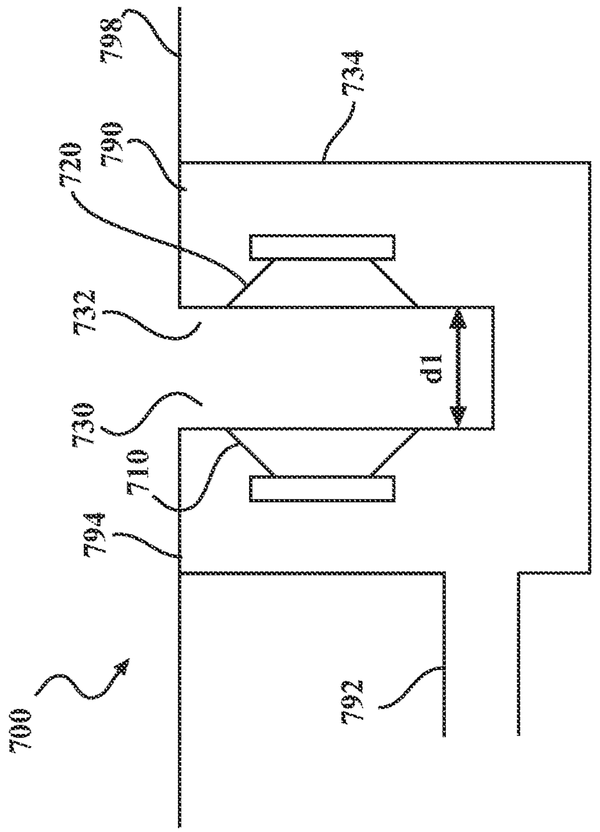
FIG. 7 schematically illustrates a cross-sectional view of an exemplary loudspeaker arrangement.

Now referring to FIG. 7, a cross-sectional view of the arrangement described with respect to FIG. 6 is schematically illustrated. FIG. 7 illustrates the first loudspeaker 710 and the second loudspeaker 720 facing each other (first side of first sound radiating surface faces first side of second sound radiating surface), with a first cavity 730 formed between the first loudspeaker 710 and the second loudspeaker 720. As has been described with respect to FIG. 3 above, the first loudspeaker 710 (i.e., the first speaker basket) and the second loudspeaker 720 (i.e., the second speaker basket) are mechanically coupled to each other. The first loudspeaker 710 (or first loudspeaker basket) can be connected to the second loudspeaker 720 (or second loudspeaker basket) by means of connection elements, as has been described with respect to FIG. 3 above. It is also possible to glue the first and second loudspeakers 710, 720 together. The first loudspeaker 710 and the second loudspeaker 720 are mounted in an enclosure 734 which forms a back cavity 790 enclosing the back side of the first loudspeaker 710 and the back side of the second loudspeaker 720 (second side of first sound radiating surface and second side of second sound radiating surface face towards back cavity 790. The enclosure 734 comprises a port 792 configured to couple the back cavity 790 to outside air. The loudspeaker arrangement 700 can be mounted to a panel 798 of a vehicle, for example, the panel 798 separating the internal air volume from outside air. The loudspeaker arrangement 700 can comprise a cover 794 which closes the enclosure 734 or back cavity 790 towards the internal air volume. The cover 794 comprises an opening, as has been described with respect to FIG. 6 above, which is aligned with the opening 732 of the first cavity 730.

Figure 8:
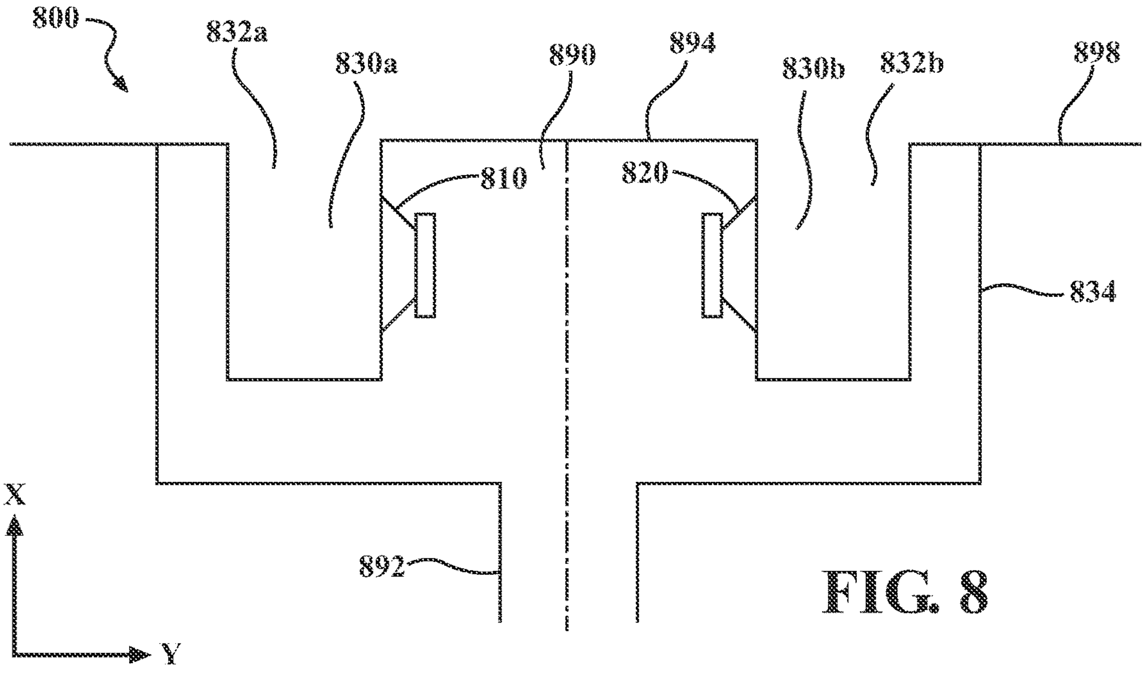
FIG. 8 schematically illustrates a cross-sectional view of another exemplary loudspeaker arrangement.

The first loudspeaker 710 and the second loudspeaker 720 and, optionally, additional loudspeakers all facing towards a single cavity 730 formed between a first side of a first sound radiating surface (first loudspeaker 710) and a first side of a second sound radiating surface (second loudspeaker 720), however, is only an example. According to another example and as schematically illustrated in FIG. 8, it is alternatively possible that a second side of the first sound radiating surface is arranged opposite to and faces a second side of the second sound radiating surface. Similar to the arrangements described with respect to FIGS. 1 to 7 above, in the example of FIG. 8, the first sound radiating surface is arranged essentially parallel to the second sound radiating surface, and the first loudspeaker 810 (i.e., the first loudspeaker basket) is mechanically coupled to the second loudspeaker 820 (i.e., the second loudspeaker basket) in order to cancel vibrations generated by each of the two loudspeakers 810, 820 out. However, in the example illustrated in FIG. 8, each of the first loudspeaker 810 and the second loudspeaker 820 faces a cavity 830*a*, 830*b* distinct and separate from the respective other cavity. That is, the first loudspeaker 810 (first side of first sound radiating surface) faces a second cavity 830*a*, and the second loudspeaker 820 (first side of second sound radiating surface) faces a third cavity 830*b*, distinct and separate from the second cavity 830*a*. The second cavity 830*a* comprises a second opening 832*a* towards the internal air volume, and the third cavity 830*b* comprises a third opening 832*b* towards the internal air volume.

The first loudspeaker 810 and the second loudspeaker 820 are arranged in an enclosure 834 which forms a back cavity 890 surrounding the back side of the first loudspeaker 810 (second side of first sound radiating surface) and the back side of the second loudspeaker 820 (second side of second sound radiating surface). The enclosure 834 comprises a port 892, similar to the arrangements described with respect to FIGS. 6 and 7 above, which couples the back cavity 890 to outside air. The first loudspeaker 810 and the second loudspeaker 820 are mechanically coupled to each other, similar to what has been explained above. According to one example, a first loudspeaker basket of the first loudspeaker is coupled to a second loudspeaker basket of the second loudspeaker 829 along a connecting line, indicated with a dot-dashed line in FIG. 8. The loudspeakers 810, 820 can either be coupled to each other by means of first and second connection elements, as has been described with respect to FIG. 3 above. It is, however, also possible to glue the loudspeakers 810, 820 together along the connection line, or to use any other suitable kind of connection elements. The loudspeaker arrangement 800 can further comprise a cover 894, wherein the cover comprises two openings, wherein each of the two openings of the cover 894 is aligned with a different one of the second opening 832*a* of the second cavity 830*a*, and the third opening 832*b* of the third cavity 830*b*.

The port 892 in FIG. 8 is arranged centrally between the first loudspeaker 810 and the second loudspeaker 820. This, however, is only an example. The port 892 can be arranged at any suitable position of the enclosure 834. Generally, the exact position of the port 892 can depend on the design of a vehicle or a wall to which the loudspeaker arrangement 800 is mounted. The loudspeaker arrangement 800 can be mounted to a panel 898 of a vehicle, for example, the panel 898 separating the internal air volume from outside air.

As has been described above, a loudspeaker arrangement comprises two or more loudspeakers. A first loudspeaker and a second loudspeaker can be arranged such that their membranes or sound radiating surfaces are (mechanically) arranged parallel to each other. According to one example, the first side of the first sound radiating surface of the first loudspeaker faces a first side of the second sound radiating surface of the second loudspeaker (see, e.g., FIG. 7). According to another example, the second side of the first sound radiating surface of the first loudspeaker faces a second side of the second sound radiating surface of the second loudspeaker (see, e.g., FIG. 8). Additional loudspeakers can be arranged such that their sound radiating surface is aligned with either the sound radiating surface of the first loudspeaker, or with the sound radiating surface of the second loudspeaker. That is, the sound radiating surface of each of at least one additional loudspeaker is arranged in the same plane as either the sound radiating surface of the first loudspeaker or the sound radiating surface of the second loudspeaker. According to one example, the loudspeaker arrangement comprises an even number of loudspeakers, wherein two loudspeakers together form a pair of loudspeakers, respectively. The pairs of loudspeakers can be arranged adjacent to each other in one row, similar to what has been described with respect to FIG. 3 above. In an arrangement as has been described with respect to FIG. 7 above, a first side of the sound radiating surface of each of the additional loudspeakers faces the first cavity 730. In an arrangement as has been described with respect to FIG. 8 above, a first side of a sound radiating surface of a first loudspeaker of each pair of loudspeakers faces the second cavity 830*a*, and a first side of a sound radiating surface of a second loudspeaker of each pair of loudspeakers faces the third cavity 830*b*.

Figure 9:
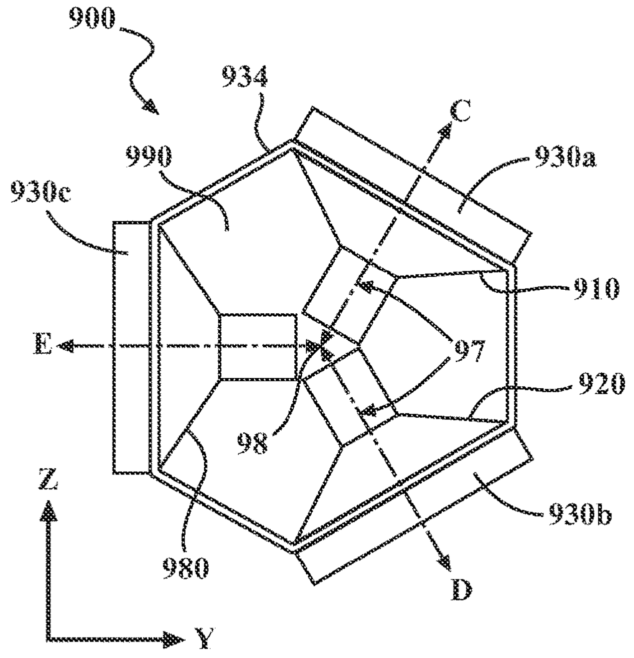
FIG. 9 schematically illustrates a loudspeaker arrangement comprising an uneven number of loudspeakers according to one example.

Now referring to FIG. 9, a loudspeaker arrangement 900 comprising an uneven number of loudspeakers according to one example is schematically illustrated. The loudspeaker arrangement 900 in this example comprises three loudspeakers 910, 920, 980. The second sides of the sound radiating surfaces of each of the loudspeakers 910, 920, 980 are oriented towards each other. The first sides of the sound radiating surfaces of each of the loudspeakers 910, 920, 980 are positioned away from each other. Each of the three loudspeakers 910, 920, 980 are arranged at an equal angle 97 from each other in a radial array. As is illustrated in FIG. 9, the three loudspeakers 910, 920, 980 are oriented so that the central axes C, D, E of the acoustic radiation are oriented at generally 120 degrees from each other. The acoustic radiation C, D, E from the second side of the sound radiating surfaces intersects at the circumcenter 98. The loudspeakers 910, 920, 980 are arranged in an enclosure 934. The enclosure 934 in this example is shaped as a hexagon with one of the loudspeakers mounted on alternating sides of the hexagon. However, the enclosure 934 could also be triangular, for example, with one of the loudspeakers 910, 920, 980 mounted on each side of the enclosure 934. Each of the loudspeakers 910, 920, 980 (first side of each sound radiating surface) faces a separate cavity 930*a*, 930*b*, 930*c*. The loudspeakers 910, 920, 980 are mechanically coupled to each other.

Figure 10:
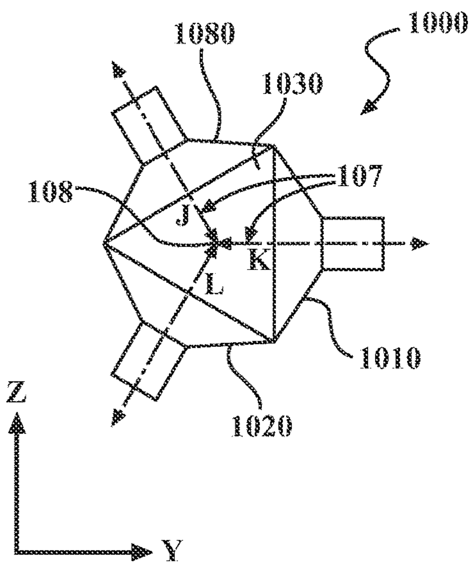
FIG. 10 schematically illustrates a loudspeaker arrangement comprising an uneven number of loudspeakers according to another example.

FIG. 10 illustrates another exemplary loudspeaker arrangement 1000 comprising an uneven number of loudspeakers 1010, 1020, 1080. In this example, the first sides of the sound radiating surfaces of the loudspeakers 1010, 1020, 1080 are oriented toward each other. The second sides of the sound radiating surfaces of the loudspeakers 1010, 1020, 1080 are oriented away from each other. Each of the three loudspeakers 1010, 1020, 1080 are arranged at an equidistant angle 107 from each other in a radial array. As is illustrated in FIG. 10, the three transducers 1010, 1020, 1080 are oriented so that the central axes J, K, L of the acoustic radiation are angularly equidistant from each other. In this example with three loudspeakers 1010, 1020, 1080, the central axes J, K, L are oriented at generally 120 degrees from each other. The acoustic radiation J, K, L from the first sides of the sound radiating surfaces intersect at the circumcenter 108 of a cavity 1030. The loudspeakers 1010, 1020, 1080 can be arranged in an enclosure (not specifically illustrated in FIG. 10) which encloses the second sides of the sound radiating surfaces of the loudspeakers 101, 1020, 1080. In the example illustrated in FIG. 10, the cavity 1030 has a triangular form. This, however, is only an example. Other forms are generally possible. The loudspeakers 1010, 1020, 1080 are mechanically coupled to each other.

The first, second and third direction x, y, z are used throughout the description for illustrative purposes only. The directions are not meant to be defined with regard to a ground surface. Rather, the directions are merely used to illustrate the orientation of the different elements and their arrangement with regard to each other. When mounted into a wall or inside a vehicle, the described loudspeaker arrangement may be rotated into any suitable position resulting in any suitable orientation.

While various embodiments of the invention have been described, it will be apparent to those of ordinary skill in the art that many more embodiments and implementations are possible within the scope of the invention. In particular, the skilled person will recognize the interchangeability of various features from different embodiments. Although these techniques and systems have been disclosed in the context of certain embodiments and examples, it will be understood that these techniques and systems may be extended beyond the specifically disclosed embodiments to other embodiments and/or uses and obvious modifications thereof. Accordingly, the invention is not to be restricted except in light of the attached claims and their equivalents.

The description of embodiments has been presented for purposes of illustration and description. Suitable modifications and variations to the embodiments may be performed in light of the above description or may be acquired from practicing the methods. The described arrangements are exemplary in nature, and may include additional elements and/or omit elements. As used in this application, an element recited in the singular and proceeded with the word “a” or “an” should be understood as not excluding plural of said elements, unless such exclusion is stated. Furthermore, references to “one embodiment” or “one example” of the present disclosure are not intended to be interpreted as excluding the existence of additional embodiments that also incorporate the recited features. The terms “first,” “second,” and “third,” etc. are used merely as labels, and are not intended to impose numerical requirements or a particular positional order on their objects. The described systems are exemplary in nature, and may include additional elements and/or omit elements. The subject matter of the present disclosure includes all novel and non-obvious combinations and sub-combinations of the various systems and configurations, and other features, functions, and/or properties disclosed. The following claims particularly point out subject matter from the above disclosure that is regarded as novel and non-obvious.

The invention claimed is:

1. A loudspeaker arrangement comprising:
a first loudspeaker having a first sound radiating surface;
a second loudspeaker having a second sound radiating surface;
an enclosure (734, 834);
the first loudspeaker is mechanically coupled to the second loudspeaker;
the enclosure encloses the second side of the first sound radiating surface and the second side of the second sound radiating surface;
the enclosure has a port coupling a back cavity inside the enclosure to outside air; and
either a first side of the first sound radiating surface faces a first side of the second sound radiating surface, and the first side of the first sound radiating surface and the first side of the second sound radiating surface both face a first cavity, the first cavity has a first opening facing towards an internal air volume; or
a second side of the first sound radiating surface faces a second side of the second sound radiating surface, the first side of the first sound radiating surface faces a second cavity, the second cavity has a second opening (832*a*) facing towards the internal air volume, and the first side of the second sound radiating surface faces a third cavity separate and distinct from the second cavity, the third cavity has a third opening facing towards the internal air volume.

2. The loudspeaker arrangement of claim 1, wherein the sound radiating surface of the first loudspeaker is arranged parallel to the sound radiating surface of the second loudspeaker.

3. The loudspeaker arrangement of claim 1, further comprising at least one additional loudspeaker having a third sound radiating surface;
either a first side of the third sound radiating surface faces the first sides of the first sound radiating surface and the second sound radiating surface, and faces the first cavity (; or
a second side of the third sound radiating surface faces the second sides of the first sound radiating surface and the second sound radiating surface, and faces a fifth cavity separate and distinct from the first cavity and the second cavity, the fifth cavity has a fifth opening facing towards the internal air volume.

4. The loudspeaker arrangement of claim 1, wherein;
the loudspeaker arrangement has an even number of loudspeakers;
two loudspeakers together form a pair of loudspeakers;
the pairs of loudspeakers are arranged in one row; and
either a first side of the sound radiating surface of each of the loudspeakers in the pair of loudspeakers faces the first cavity; or
a first side of a sound radiating surface of a first loudspeaker of each pair of loudspeakers faces the second cavity, and a first side of a sound radiating surface of a second loudspeaker of each pair of loudspeakers faces the third cavity.

5. The loudspeaker arrangement of claim 1, further comprising a cover configured to close the enclosure towards the internal air volume.

6. The loudspeaker arrangement of claim 5, wherein;
either the cover has an opening aligned with the first opening of the first cavity; or the cover has two openings each of the two openings of the cover is aligned with a different one of the second opening of the second cavity and the third opening of the third cavity.

7. The loudspeaker arrangement of claim 5, wherein;

either the cover forms a part of a panel in the interior of a vehicle; or the cover forms a part of a wall in a room.

8. The loudspeaker arrangement of claim 1, wherein;

either the first opening is covered with a fabric or mesh; or the second opening and the third opening are covered with a fabric or mesh.

9. The loudspeaker arrangement of claim 1, wherein the first loudspeaker has a first speaker basket, the second loudspeaker has a second speaker basket, and the first speaker basket is mechanically coupled to the second speaker basket.

10. The loudspeaker arrangement of claim 9, further comprising a plurality of first connection elements and a plurality of second connection elements configured to connect the first speaker basket to the second speaker basket.

11. The loudspeaker arrangement of claim 9, wherein the first speaker basket and the second speaker basket are glued together.

12. The loudspeaker arrangement of claim 9, wherein;

a first side of the first sound radiating surface faces a first side of the second sound radiating surface, and the first side of the first sound radiating surface and the first side of the second sound radiating surface both face a first cavity, the first cavity has a first opening facing towards an internal air volume;

the first speaker basket has a first projection extending from the first speaker basket in a first direction (y) towards the second loudspeaker;

the second speaker basket has a second projection extending from the second speaker basket in the first direction (y) towards the first loudspeaker; and the first projection is mechanically coupled to the second projection defining the first cavity between a front side of the first loudspeaker and a front side of the second loudspeaker.

13. The loudspeaker arrangement of claim 12, wherein;

the first projection and the second projection are omitted in a second direction (z) that is perpendicular to the first direction (y), in order to form the first opening.

14. The loudspeaker arrangement of claim 1, wherein;

either the first opening has a rectangular cross-section with rounded corners, a square cross-section, a rectangular cross-section, a rounded cross-section, or an oval cross-section; or each of the second opening and the third opening has a rectangular cross-section with rounded corners, a square cross-section, a rectangular cross-section, a rounded cross-section, or an oval cross-section.

15. The loudspeaker arrangement of claim 1, wherein the loudspeaker arrangement is mounted to a panel of a vehicle, the panel separating the internal air volume from outside air.

* * * * *